UNITED STATES PATENT OFFICE.

JULIUS HAUSER, OF LOS ANGELES, CALIFORNIA.

BRANDING OR MARKING COMPOSITION.

No. 875,174.     Specification of Letters Patent.     Patented Dec. 31, 1907.

Application filed March 16, 1905. Serial No. 250,439.

*To all whom it may concern:*

Be it known that I, JULIUS HAUSER, a citizen of the United States, residing at Los Angeles, in the county of Los Angeles, State of California, have invented a certain new and useful Branding Composition, of which the following is a specification.

This invention relates to a composition in liquid form for use in branding or marking salt and smoked meats, and has for its object the provision of such a composition which may be applied to the surface of such meats, preferably on the skin thereof, after the process of curing the same, and which will instantaneously penetrate into the skin thereof when applied thereto in such a manner as to render it impossible to obliterate the mark or brand without cutting from the meat that portion so branded.

The composition is peculiarly and particularly adapted for use with pork after the process of salting and before smoking the same in the manufacture of salt-pork, bacon and hams, as it then penetrates in a superior manner and becomes ineffaceable. It may be applied either by the use of a rubber stamp, stencil or other means after the pork is taken out of the brine, and before it is smoked or dried.

The composition consists of substantially one ounce (troy) hydrochlorate of nitrobenzene combined with one-half ounce (fluid measure) of muriatic acid and substantially three ounces (fluid measure) of glycerin. I regard indulin and nigrosin as substantial equivalents for this purpose of the hydrochlorate of nitrobenzene. The muriatic acid may be chemically pure of a strength of about thirty-one per cent. The exact proportions are not deemed essential, but may be varied.

Use of this composition on the skin of pork after it has been pickled in salt brine; viz.,—the usual solution of chlorid of sodium,—has demonstrated that immediately upon the application of the composition to the skin, it penetrates the same and will not blur or wash or scrape off, and upon smoking, leaves a bright, clear brand.

I do not assume to give the chemical reactions that occur, but find the results to be as stated with the composition stated when the ingredient named, known as indulin, that known as nigrosin, or that known as hydrochlorate of nitro-benzene, is used as stated. I do not assume to state that said indulin, nigrosin, and hydrochlorate of nitro-benzene are chemically the same, but my experience shows that they are equivalents for the purpose of this invention, and for that purpose I regard indulin, nigrosin, and hydrochlorate of nitro-benzene to be equivalent materials, and I use the substance I obtain under those names, as equivalents.

While this composition is peculiarly adapted for use with salted pork, in the manufacture of salt pork, bacon, and ham, it may be used with other meats, and I do not confine myself to its use with pork.

Having thus described my invention, I claim as new and desire to secure by Letters-Patent:

1. A branding or marking composition for meats, consisting of hydrochlorate of nitrobenzene compounded with muriatic acid and glycerin.

2. A branding or marking compound for meats, consisting of hydrochlorate of nitrobenzene, muriatic acid and glycerin, compounded in substantially the proportions of one ounce of hydrochlorate of nitrobenzene, to one-half ounce of muriatic acid and three ounces of glycerin.

In testimony whereof, I have hereunto set my hand at Los Angeles California this 10th day of March 1905.

JULIUS HAUSER.

In presence of—
    FREDERICK B. LYON,
    JULIA TOWNSEND.